US012155141B2

(12) United States Patent
Baumann

(10) Patent No.: US 12,155,141 B2
(45) Date of Patent: Nov. 26, 2024

(54) CONNECTOR ASSEMBLY HAVING A CABLE CONNECTED CHARGING PIN AND SOCKET IN FLUID COMMUNICATION WITH ONE ANOTHER

(71) Applicant: Caterpillar Inc., Peoria, IL (US)

(72) Inventor: Jonathan M. Baumann, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 342 days.

(21) Appl. No.: 17/457,305

(22) Filed: Dec. 2, 2021

(65) Prior Publication Data
US 2023/0178918 A1 Jun. 8, 2023

(51) Int. Cl.
H01R 13/00 (2006.01)
B08B 9/032 (2006.01)
(Continued)

(52) U.S. Cl.
CPC ........... H01R 13/005 (2013.01); B08B 9/032 (2013.01); H01M 10/44 (2013.01);
(Continued)

(58) Field of Classification Search
CPC ...... B08B 9/032; H01R 13/005–43/002; H02J 7/0042
See application file for complete search history.

(56) References Cited

U.S. PATENT DOCUMENTS 4,700,743 A * 10/1987 L'Henaff ................ F16L 37/35
137/614.04
8,208,250 B2 * 6/2012 Mongia ................ G06F 1/1632
312/236
(Continued)

FOREIGN PATENT DOCUMENTS

DE   102015100347   7/2016
FR       2578950    9/1986
(Continued)

OTHER PUBLICATIONS

Written Opinion and International Search Report for Int'l. Patent Appln. No. PCT/US2022/080301, mailed Mar. 30, 2023 (15 pgs).

Primary Examiner — Vanessa Girardi
(74) Attorney, Agent, or Firm — Harrity & Harrity LLP

(57) ABSTRACT

A connector assembly for charging a work machine includes at least one charging cable and at least one connector arrangement. The connector arrangement includes a socket. The socket defines a plurality of first through-apertures extending radially relative to a first longitudinal axis and a first passage. The connector arrangement also includes a charging pin adapted to couple with the socket. The charging pin defines a plurality of second through-apertures extending radially relative to a second longitudinal axis and a second passage. Further, when the socket is connected with the charging pin, the second passage aligns with the first passage and the second passage is in fluid communication with the first passage. Moreover, when the socket is connected with the charging pin, a fluid flowing through the socket and the charging pin is adapted to at least one of cool and clean the connector assembly.

20 Claims, 11 Drawing Sheets

(51) Int. Cl.
*H01M 10/44* (2006.01)
*H01R 43/00* (2006.01)
*H02J 7/00* (2006.01)

(52) U.S. Cl.
CPC .......... *H01R 43/002* (2013.01); *H02J 7/0042* (2013.01); *H01M 2220/20* (2013.01)

(56) References Cited

U.S. PATENT DOCUMENTS

| | | |
|---|---|---|
| 10,029,575 B2 | 7/2018 | Remisch |
| 10,109,395 B2 * | 10/2018 | Beimdieck ........... H01R 13/005 |
| 10,632,861 B2 * | 4/2020 | Beimdieck ........... H01R 13/005 |
| 10,644,422 B2 | 5/2020 | Moseke |
| 2018/0264957 A1 | 9/2018 | Fuehrer et al. |
| 2020/0317071 A1 | 10/2020 | Hakenberg |
| 2020/0353830 A1 | 11/2020 | Duenkel et al. |

FOREIGN PATENT DOCUMENTS

| | | |
|---|---|---|
| WO | 9104122 | 4/1991 |
| WO | 2017076545 | 5/2017 |

\* cited by examiner

CONNECTOR ASSEMBLY HAVING A CABLE CONNECTED CHARGING PIN AND SOCKET IN FLUID COMMUNICATION WITH ONE ANOTHER

TECHNICAL FIELD

The present disclosure relates to a connector assembly for charging a work machine and a method for at least one of cooling and cleaning the connector assembly.

BACKGROUND

From an environment standpoint and in order to reduce dependence on conventional energy resources, electric work machines are now being employed at various worksites. The electric work machine typically includes a battery system for supplying operational power to one or more components of the electric work machine. The battery system may have to be charged periodically, as per application requirements. Charging of the battery system may require coupling of an external charging source with a socket disposed on the electric work machine. The external charging source may include a charging cable and a plug that may connect with the socket. Typically, the socket and the plug may be used to form an interface between the external charging source and the battery system.

Electric work machines may benefit from quick charging of the battery system, for example, to improve productivity at a worksite. In an example, quick charging of the battery system may eliminate a requirement of multiple battery systems on board the electric work machine. In some cases, the quick charging of the battery system may also eliminate a requirement of frequent removal and installation of large-sized battery system for offboard charging.

During the charging of the battery system, a temperature of the plug, the socket, and/or other components that connect the external charging source with the battery system may increase. Often, the plug and socket contacts of the socket may limit an amount of current that can be utilized to quickly charge the battery system. Specifically, a resistance at the socket contacts are typically high, such that at high current levels, a large amount of heat may be generated which may limit the amount of current that can be utilized to charge the battery system. Thus, in order to enable quick charging of the battery system, components that establish an electrical connection between the battery system and the external charging source may have to be maintained below a desired operating temperature while conducting large amounts of current into the battery system.

Moreover, in mining and construction applications, an environment in which the electric work machines operate may be often dirty and/or dusty, and may include small abrasive particles. Such particles, when introduced in the socket contacts may lead to wear of the socket and may also increase a resistance of the interface between the battery system and the external charging source. The wear from debris ingress may shorten a life of the socket contacts and may also lead to premature failure thereof. Thus, a technique may be required to facilitate cooling as well as cleaning of one or more components that establish the electrical connection between the external charging source and the battery system.

DE102015100347A1 describes an electrical connection body for a charging plug and/or a charging socket, the electrical connection body has a first connection area for galvanic connection with an electrical energy receiver and a second connection area for galvanic connection with an electrical energy source. The electrical connection body being characterized in that it has a cooling fluid channel formed in the electrical connection body. The present invention also discloses a charging plug for coupling to a corresponding connection device and for transmitting electrical energy, the charging plug being characterized in that it has an electrical connection body according to the invention, the cooling fluid channel of the electrical connection body is fluidly connected to a source of cooling fluid. The present invention also discloses a charging station for delivering electrical energy to a receiver of electrical energy, the charging station being characterized in that it has a charging plug according to the invention and a cooling fluid source which can be fluidly connected to the cooling fluid channel of the electrical connection body.

SUMMARY OF THE DISCLOSURE

In one aspect of the present disclosure, a connector assembly for charging a work machine is provided. The connector assembly includes at least one charging cable. The connector assembly also includes at least one connector arrangement. The at least one connector arrangement includes a socket disposed on the work machine. The socket extends along a first longitudinal axis. The socket defines a plurality of first through-apertures extending radially relative to the first longitudinal axis. The socket also defines a first passage extending along the first longitudinal axis and in fluid communication with each of the plurality of first through-apertures. The at least one connector arrangement also includes a charging pin electrically connected to the at least one charging cable. The charging pin is adapted to couple with the socket. The charging pin extends along a second longitudinal axis. The charging pin defines a plurality of second through-apertures extending radially relative to the second longitudinal axis. The charging pin also defines a second passage extending along the second longitudinal axis and in fluid communication with each of the plurality of second through-apertures. Further, when the socket is connected with the charging pin, the second passage aligns with the first passage and the second passage is in fluid communication with the first passage. Moreover, when the socket is connected with the charging pin, a fluid flowing through the socket and the charging pin is adapted to at least one of cool and clean the connector assembly.

In another aspect of the present disclosure, a method for at least one of cooling and cleaning a connector assembly is provided. The connector assembly allows charging of a work machine. The connector assembly includes at least one charging cable. The method includes connecting a charging pin of at least one connector arrangement of the connector assembly with a socket of the at least one connector arrangement. The socket is disposed on the work machine and extends along a first longitudinal axis. The socket defines a plurality of first through-apertures extending radially relative to the first longitudinal axis, and a first passage extending along the first longitudinal axis and in fluid communication with each of the plurality of first through-apertures. Further, the charging pin is electrically connected to the at least one charging cable and extends along a second longitudinal axis. The charging pin defines a plurality of second through-apertures extending radially relative to the second longitudinal axis, and a second passage extending along the second longitudinal axis and in fluid communication with each of the plurality of second through-apertures. Moreover, when the socket is connected with the charging pin, the second passage aligns with the first passage and the second passage is in fluid communication with the first passage. The method also includes introducing a fluid in the connector assembly, such that, when the charging pin is connected with the socket, the fluid flowing through the socket and the charging pin of the at least one connector arrangement is adapted to at least one of cool and clean the connector assembly.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1A:
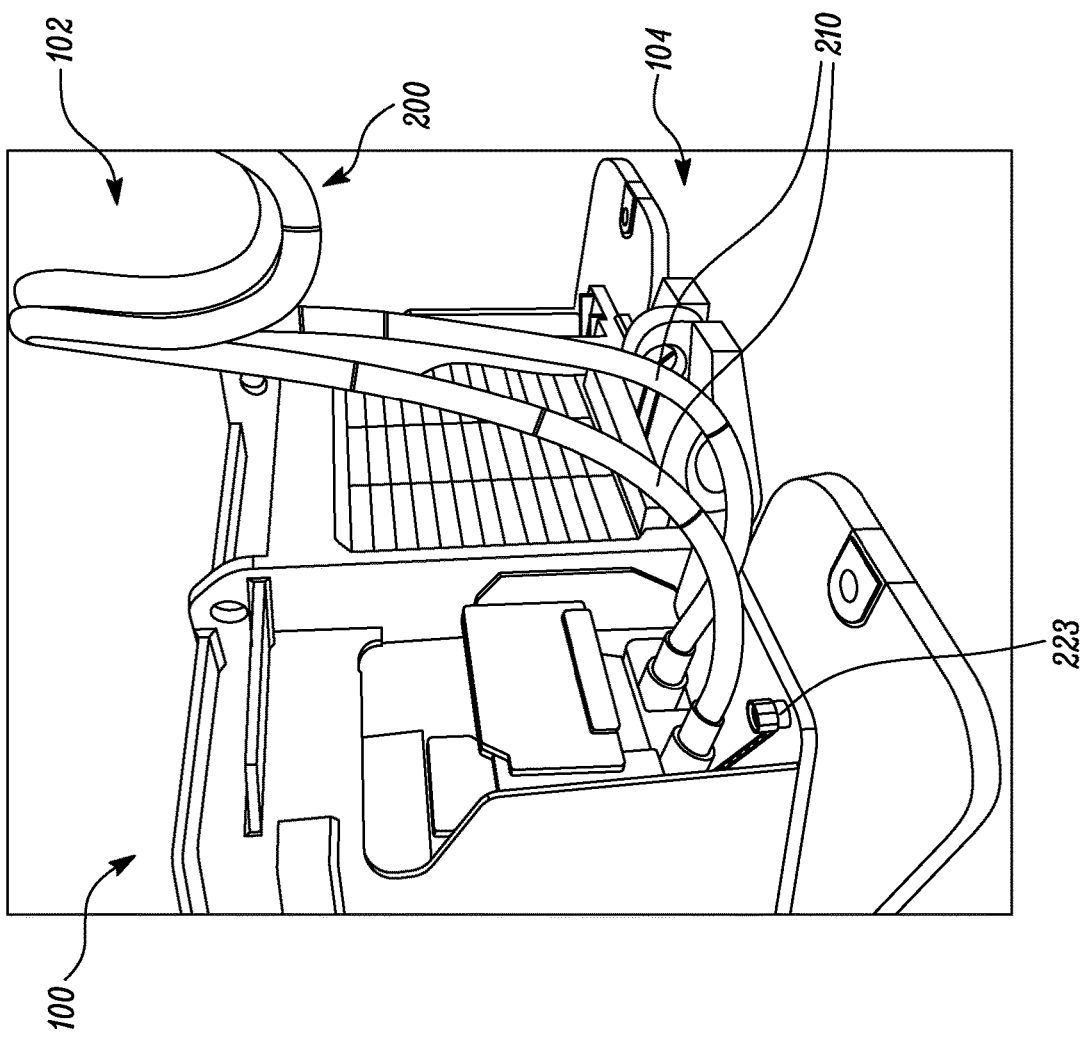
FIG. 1A illustrates a perspective view of a portion of the work machine, according to examples of the present disclosure.

Referring to FIG. 1A, a portion of an exemplary work machine 100 is illustrated. The work machine 100 may operate at a worksite 102, such as, a mine site, a land fill, a quarry, a construction site, and the like. The worksite 102 may include an underground worksite. The work machine 100 is embodied as a loader herein, without limiting the scope of the present disclosure. For example, the work machine 100 may embody an underground loader, without any limitations. Alternatively, the work machine 100 may be embodied as an off-highway truck, a dozer, an excavator, a tractor, a motor grader, a mining truck, a scraper, etc. that may be used in various industries.

The work machine 100 may define a first end 104 and a second end (not shown) opposite to the first end 104. Further, the work machine 100 may include an operator cabin (not shown) where an operator may be seated to operate the work machine 100. Furthermore, the work machine 100 may wheels (not shown) that provide support and mobility to the work machine 100 on grounds. Alternatively, the work machine 100 may include tracks or drums instead of wheels. Moreover, the work machine 100 may further include an implement (not shown) disposed proximate to the second end. The implement may be used to perform one or more work operations, such as loading, material removal, stock piling, dumping, and the like.

Figure 1B:
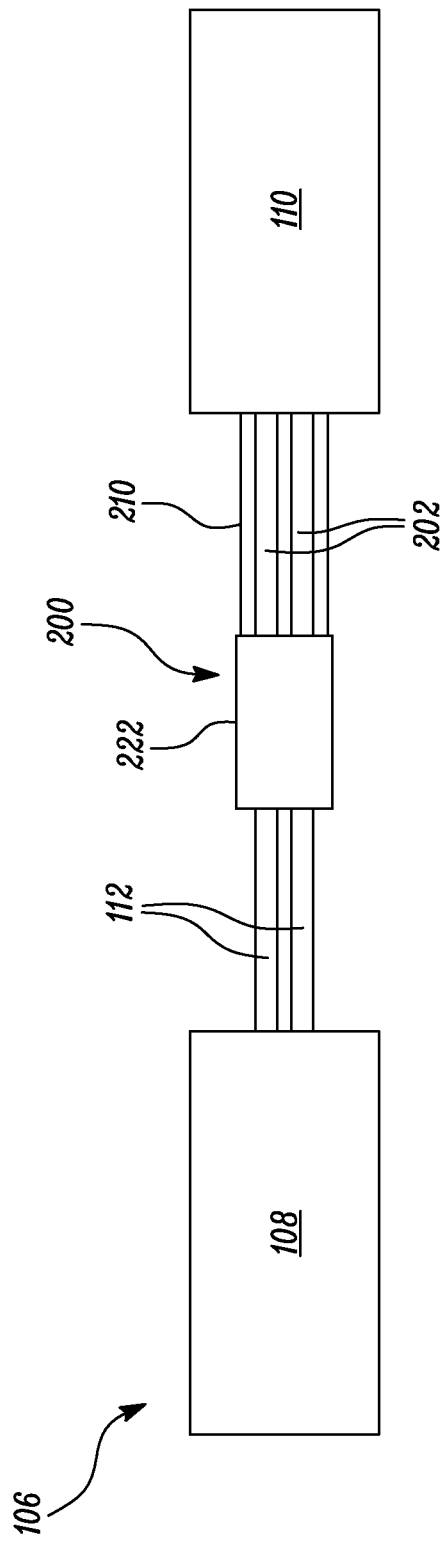
FIG. 1B illustrates a schematic view of a battery system and an external charging source for charging the battery system according to different embodiments of the present disclosure.

Referring to FIG. 1B, the work machine 100 includes a power source 106. The power source 106 may provide power to the work machine 100 for operational and mobility requirements. In some examples, the work machine 100 may embody a hybrid work machine, such that the power source 106 may include a combination of an engine and a battery. In the illustrated example of FIG. 1B, the work machine 100 is embodied as an electric work machine. In the illustrated example of FIG. 1B, the power source 106 includes a battery system 108. The battery system 108 may be electrically, mechanically, and operatively connected to the work machine 100. The battery system 108 may be used to power various components of the work machine 100, such as, the wheels, the implement, and the like. In some examples, the work machine 100 may include an electric motor (not shown) that may drive one or more components of the work machine 100 based on electric energy input from the battery system 108.

Further, a size and a capacity of the battery system 108 may be based on a size of the work machine 100 and/or operational requirements of the work machine 100. A person of ordinary skill in the art will appreciate that the term "battery system" as used herein may include rechargeable electrical energy-providing modules of any kind, such as, lithium ion batteries, lead-acid batteries, nickel-metal hydride batteries, capacitors, reaction cells (e.g., Zn-air cell), without any limitations. The battery system 108 may be rechargeable and may require replacement once the battery system 108 gets discharged or spent. The battery system 108 may be charged using an external charging source 110. For example, the external charging source 110 may be located at the worksite 102 (see FIG. 1A). The external charging source 110 may embody an electric charging station.

Figure 2:
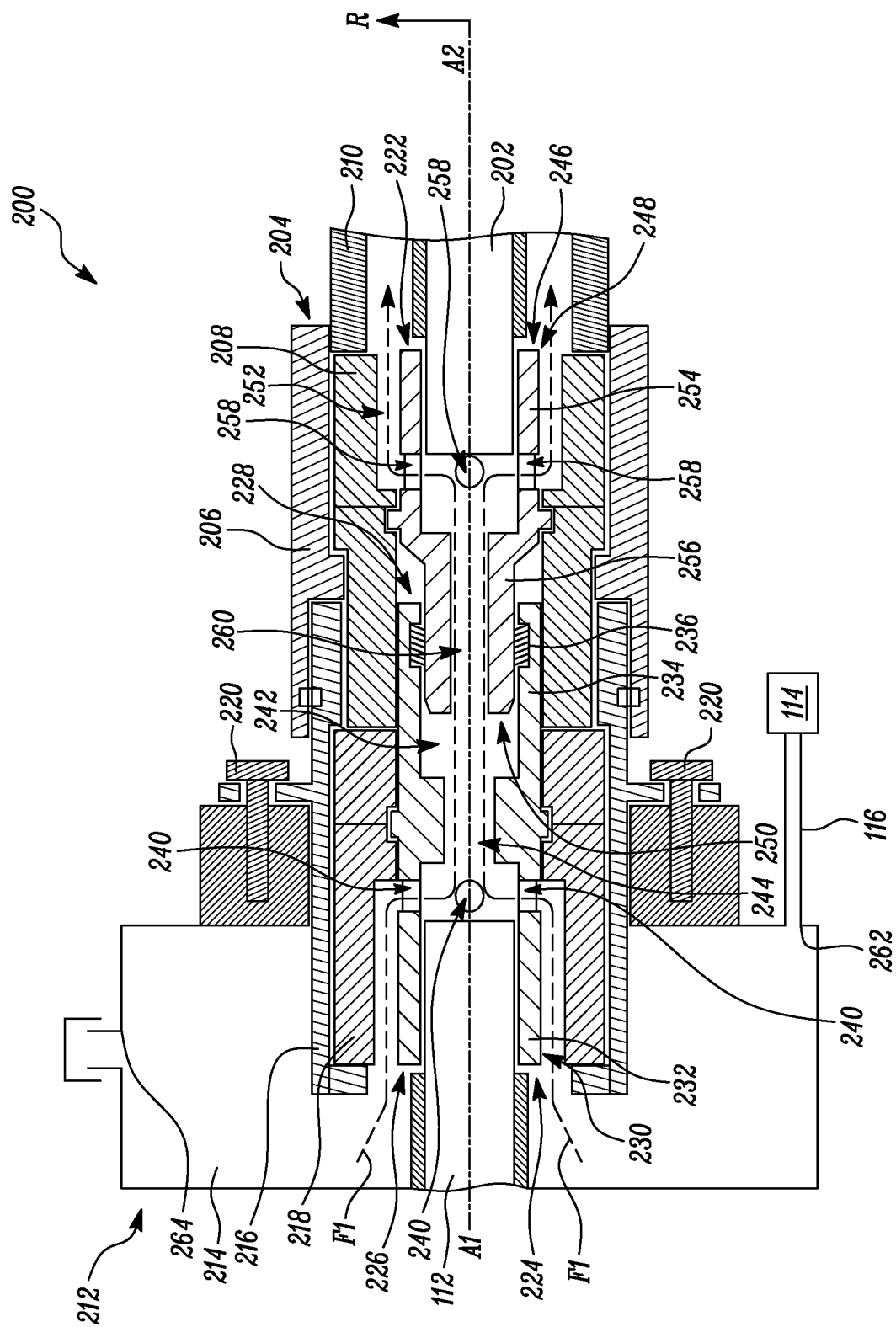
FIG. 2 illustrates a schematic view of the connector assembly, wherein the fluid enters a connector arrangement of the connector assembly via a socket thereof, according to examples of the present disclosure.

The present disclosure relates to a connector assembly 200 for charging the work machine 100. The connector assembly 200 may embody an interface between the battery system 108 and the external charging source 110 that may allow charging of the battery system 108. As shown in FIG. 2, the connector assembly 200 includes one or more charging cables 202. One end of the charging cable 202 is connected to the external charging source 110 (see FIG. 1B). Further, a plug 204 may be disposed at another end of the charging cable 202. The plug 204 may include a plug outer shell 206 and a plug insulator sleeve 208. Furthermore, the charging cable 202 may be receivable within a conduit 210.

The conduit 210 may include a flexible pipe that can receive the charging cable 202. The connector assembly 200 also includes a receptacle 212 disposed on the work machine 100. The receptacle 212 includes a receptacle box 214, a receptacle outer shell 216, and a receptacle insulator sleeve 218. The receptacle outer shell 216 is connected to the receptacle box 214 using mechanical fasteners 220.

Further, the connector assembly 200 includes one or more connector arrangements 222. In the illustrated example of FIG. 2, the connector assembly 200 includes a single connector arrangement 222. However, the connector assembly 200 may include multiple connector arrangements, as per application requirements. The connector arrangement 222 may electrically couple the charging cable 202 with a cable 112 associated with the work machine 100. One end of the cable 112 may be connected to the battery system 108 (see FIG. 1B) and another end of the cable 112 may be connected to the connector arrangement 222.

Further, the connector arrangement 222 includes a socket 224 disposed on the work machine 100 (see FIGS. 1A and 1B). The socket 224 extends along a first longitudinal axis "A1". The socket 224 includes a generally circular shape herein. The socket 224 may define a first end 226 and a second end 228. The second end 228 may be defined opposite the first end 226. The cable 112 is connected to the socket 224 proximate to the first end 226 of the socket 224. In an example, the cable 112 may be soldered to the socket 224. Further, the connector assembly 200 includes the receptacle 212 for mounting the socket 224. The socket 224 is mounted in the receptacle 212, such that the socket 224 is concentric with the receptacle outer shell 216 and the receptacle insulator sleeve 218. Moreover, a first fluid channel 230 is defined between the receptacle insulator sleeve 218 and the socket 224. The first fluid channel 230 may extend along the first longitudinal axis "A1".

The socket 224 may include a first socket portion 232 defined proximate to the first end 226 of the socket 224 and a second socket portion 234 defined proximate to the second end 228 of the socket 224. Further, the first fluid channel 230 may be defined between the first socket portion 232 and the receptacle insulator sleeve 218. Moreover, the cable 112 may be connected to the first socket portion 232. The socket 224 may also include one or more socket contacts 236 disposed proximate to the second end 228 of the socket 224. In the illustrated example of FIG. 2, the socket 224 includes the single socket contact 236. Alternatively, the socket 224 may include a pair of socket contacts spaced apart from each other along the first longitudinal axis "A1". It should be noted that a length of the socket contact 236 defined along the first longitudinal axis "A1" as illustrated herein is exemplary in nature, and the socket contact 236 may be longer in length, without any limitations. The socket contact 236 may be disposed in a groove defined in the second socket portion 234. The socket contact 236 may include a spring, a louver band, or any other electrical contact that may be used for transferring electrical power.

Further, in some examples, a covering member 223 (shown in FIG. 1) may be connected to the receptacle outer shell 216. The covering member 223 may be generally circular in shape. In some examples, the covering member 223 may be connected to the receptacle outer shell 216 by a threaded connection to facilitate easy connection and removal of the cap. Further, when the battery system 108 is not being charged, the covering member 223 may cover the socket 224 to prevent ingress of dust and debris into the socket 224. Moreover, when the battery system 108 is to be charged, the covering member 223 may be removed and a charging pin 246 may be connected to the socket 224 for charging the battery system 108.

Figure 3:
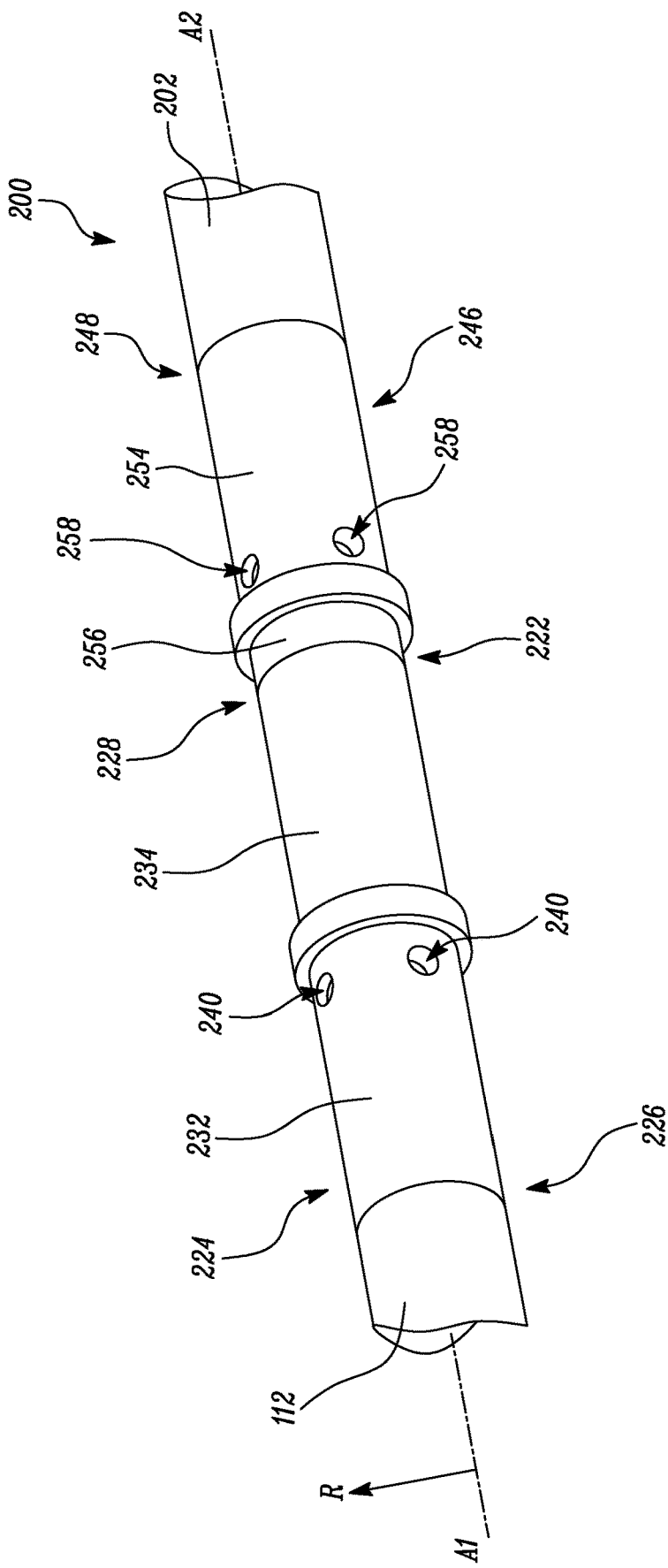
FIG. 3 illustrates a perspective view of the connector assembly of FIG. 2, according to examples of the present disclosure.

As shown in FIGS. 2 and 3, the socket 224 defines a number of first through-apertures 240 extending radially relative to the first longitudinal axis "A1". Specifically, the first through-apertures 240 extend in a radial direction "R" with respect to the first longitudinal axis "A1". Further, the number of first through-apertures 240 may be defined proximate to the first end 226 of the socket 224. Specifically, the first through-apertures 240 may be defined in the first socket portion 232 of the socket 224. The first through-apertures 240 may be in fluid communication with the first fluid channel 230. In the illustrated example of FIGS. 2 and 3, the socket 224 includes four first through-apertures 240 that are equidistantly spaced apart from each other about the first longitudinal axis "A1". Alternatively, the socket 224 may include more than four first through-apertures 240 or less than four first through-apertures 240, without any limitations.

Referring again to FIG. 2, the socket 224 may define a pin receiving space 242 proximate to the second end 228 of the socket 224. Further, the socket 224 defines a first passage 244 extending along the first longitudinal axis "A1" and in fluid communication with each of the number of first through-apertures 240. The first passage 244 may be concentrically defined within the socket 224. Further, the first passage 244 may be in fluid communication with the pin receiving space 242.

The connector arrangement 222 also includes the charging pin 246 electrically connected to the one or more charging cables 202. The charging pin 246 couples with the socket 224. Further, the charging pin 246 extends along a second longitudinal axis "A2". The charging pin 246 may define a third end 248 and a fourth end 250. The fourth end 250 may be defined opposite the third end 248. The charging cable 202 may be connected to the charging pin 246 proximate to the third end 248 of the socket 224. In an example, the charging cable 202 may be soldered to the charging pin 246. Further, the connector assembly 200 may include the plug 204 for mounting the socket 224. The charging pin 246 may be mounted within the plug 204, such that the charging pin 246 may be concentric with the plug outer shell 206 and the plug insulator sleeve 208. Moreover, a second fluid channel 252 may be defined between the plug insulator sleeve 208 and the charging pin 246. The second fluid channel 252 may extend along the second longitudinal axis "A2".

The charging pin 246 may include a first pin portion 254 defined proximate to the third end 248 of the charging pin 246 and a second pin portion 256 defined proximate to the fourth end 250 of the charging pin 246. Further, the second fluid channel 252 may be defined between the first pin portion 254 and the plug insulator sleeve 208. Moreover, the charging cable 202 may be connected to the first pin portion 254 of the charging pin 246. It should be noted that, when the charging pin 246 is connected to the socket 224, the second pin portion 256 may be partially and/or completely receivable within the pin receiving space 242 of the socket 224 for charging of the battery system (see FIG. 1B).

As shown in FIGS. 2 and 3, the charging pin 246 defines a number of second through-apertures 258 extending radially relative to the second longitudinal axis "A2". Specifically, the second through-apertures 258 may extend in the radial direction "R" with respect to the second longitudinal axis "A2". Further, the number of second through-apertures 258 may be defined proximate to the third end 248 of the socket 224. Specifically, the second through-apertures 258 may be defined in the first pin portion 254 of the charging pin 246. The second through-apertures 258 may be in fluid communication with the second fluid channel 252. In the illustrated example of FIGS. 2 and 3, the charging pin 246 includes four second through-apertures 258 that are equidistantly spaced apart from each other about the second longitudinal axis "A2". Alternatively, the charging pin 246 may include more than four second through-apertures 258 or less than four second through-apertures 258, without any limitations.

Referring again to FIG. 2, the socket 224 defines a second passage 260 extending along the second longitudinal axis "A2" and in fluid communication with each of the number of second through-apertures 258. The second passage 260 may be concentrically defined within the charging pin 246. When the socket 224 is connected with the charging pin 246, the second passage 260 aligns with the first passage 244 and the second passage 260 is in fluid communication with the first passage 244. Further, when the socket 224 is connected with the charging pin 246, a fluid flowing through the socket 224 and the charging pin 246 cools and/or cleans the connector assembly 200. In an example, the fluid may be compressed air. Specifically, the fluid flowing through various components of the connector assembly 200 may exchange heat with one or more components of the connector assembly 200 for reducing a temperature thereof.

It should be noted that the fluid may be delivered to the connector assembly 200 by an external air source 114, such as, a compressor, without any limitations. In some examples, the external air source 114 may be in fluid communication with the receptacle 212 via a hose 116. The hose 116 may connect to an inlet port 262 defined in the receptacle box 214. In other examples, the external air source 114 may be in fluid communication with the conduit 210. In some examples, the conduit 210 may be attached to the external air source 114 via the hose 116 for ease of use. Further, the fluid may include a temperature that facilitates cooling of one or more components of the connector assembly 200.

In an example, the fluid may enter the connector arrangement 222 through the socket 224. In such an example, the receptacle 212 receives the fluid from the external air source 114. An exemplary flow path "F1" of the fluid is illustrated in FIG. 2. In the illustrated example of FIG. 2, when the socket 224 is connected with the charging pin 246, the fluid may enter the one or more connector arrangements 222 through one or more of the number of first through-apertures 240 in the socket 224. Specifically, the fluid received within the receptacle box 214 may flow through the first fluid channel 230 and may be subsequently introduced in the first through-apertures 240. Further, the fluid may flow through each of the first and second passages 244, 260. Moreover, the fluid may exit the one or more connector arrangements 222 through one or more of the number of second through-apertures 258 in the charging pin 246. Specifically, the fluid received within the charging pin 246 may flow through the second passage 260 and the second through-apertures 258, and may be subsequently introduced in the second fluid channel 252. From the second fluid channel 252, the fluid may be introduced within the conduit 210 before being let out to the surrounding.

Figure 4:
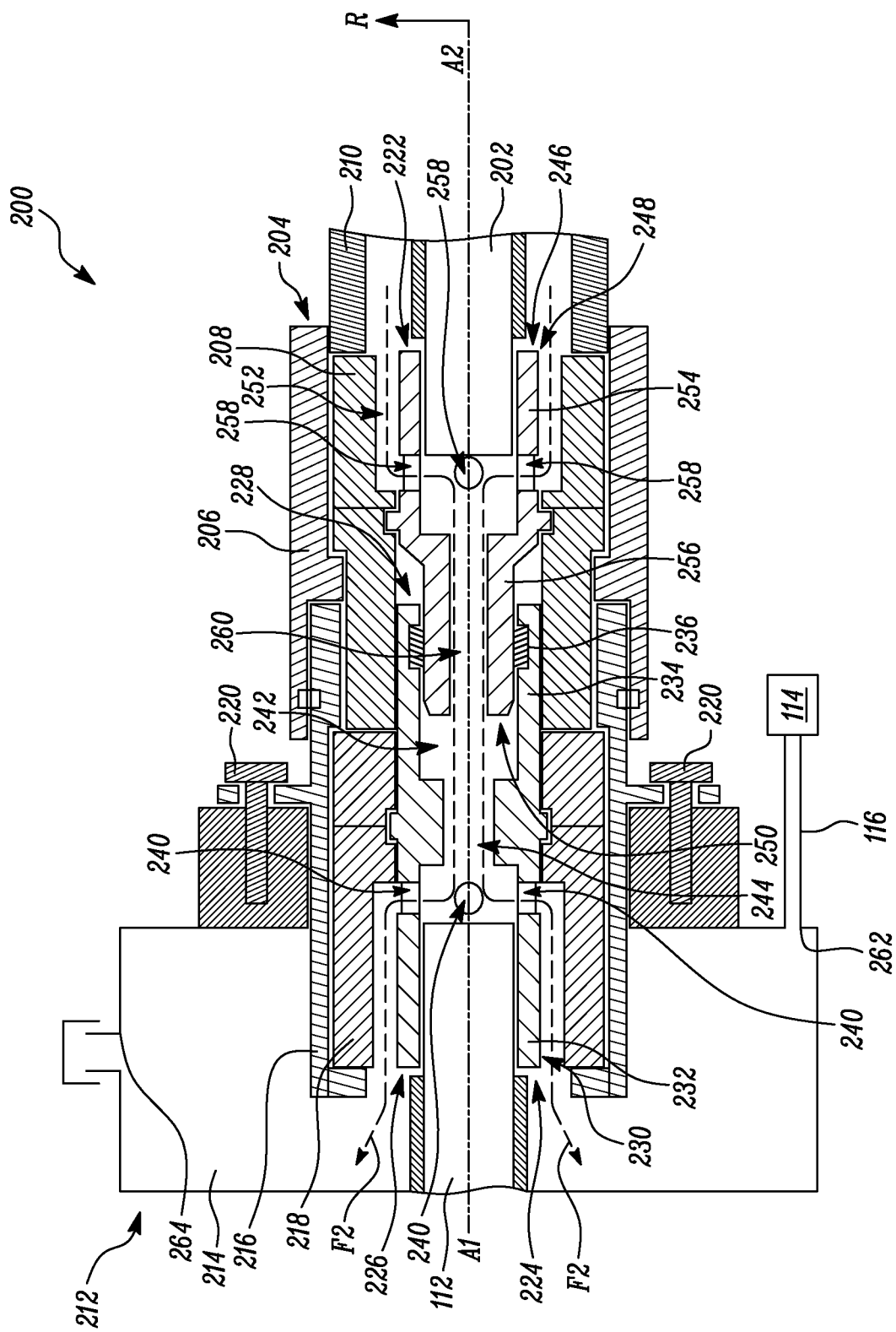
FIG. 4 is a schematic view of the connector assembly, wherein the fluid enters the connector arrangement via a charging pin thereof, according to examples of the present disclosure.

Referring now to FIG. 4, the fluid may enter the connector arrangement 222 through the charging pin 246. In such an example, the conduit 210 may receive the fluid from the external air source 114. An exemplary flow path "F2" of the fluid is illustrated in FIG. 4. In the illustrated example of FIG. 4, when the socket 224 is connected with the charging pin 246, the fluid may enter the one or more connector arrangements 222 through one or more of the number of second through-apertures 258 in the charging pin 246. Specifically, the fluid may be received within the conduit 210. Further, from the conduit 210, the fluid may flow through the second fluid channel 252 and the second through-apertures 258. Furthermore, the fluid may flow through each of the first and second passages 244, 260. Moreover, the fluid may exit the one or more connector arrangements 222 through one or more of the number of first through-apertures 240 in the socket 224. Specifically, the fluid received within the socket 224 may flow through the first passage 244 and the first through-apertures 240, and may be subsequently introduced in the first fluid channel 230. From the first fluid channel 230, the fluid may be introduced within the receptacle 212 before being let out to the surrounding via an outlet port 264 (shown in FIG. 2) defined in the receptacle box 214.

Figure 5:
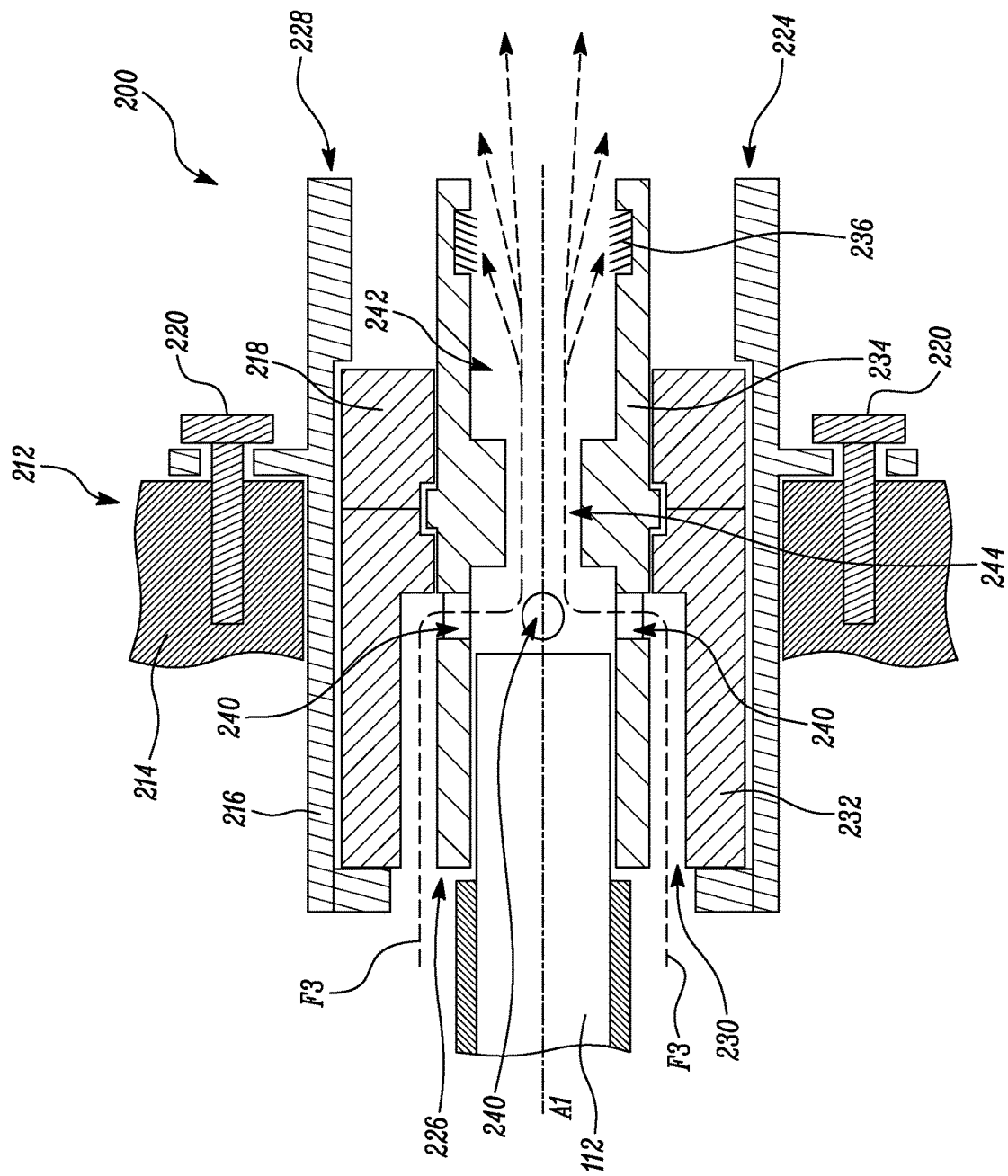
FIG. 5 is a schematic view illustrating a flow of the fluid through the socket of the connector arrangement of FIG. 2, according to another example of the present disclosure.

Further, referring to FIG. 5, a cleaning of the socket 224 of the connector assembly 200 may be accomplished when the charging pin 246 is disconnected from the socket 224. For cleaning the socket 224, the covering member 223 that covers the socket 224 may be removed. It should be noted that, when the socket 224 is disconnected from the charging pin 246, the fluid flowing through the socket 224 may clean the socket 224. An exemplary flow path "F3" of the fluid through the socket 224 is illustrated in FIG. 5.

Further, when the socket 224 is disconnected from the charging pin 246, the fluid enters the socket 224 through one or more of the number of first through-apertures 240. The fluid may be introduced in the first through-apertures 240 via the first fluid channel 230. Moreover, the fluid may exit the socket 224 through the first passage 244. While flowing through the socket 224, the fluid may cause debris present in the socket 224 to be flushed out of the socket 224, thereby cleaning the socket 224. Moreover, as the covering member 223 is disconnected from the receptacle outer shell 216 during the cleaning of the socket 224, the debris and the fluid may easily flush out from the socket 224. In some examples, the charging pin 146 may also be cleaned based on an entry of the fluid via the conduit 210 and an exit of the fluid via the second passage 260, without any limitations.

Figure 6:
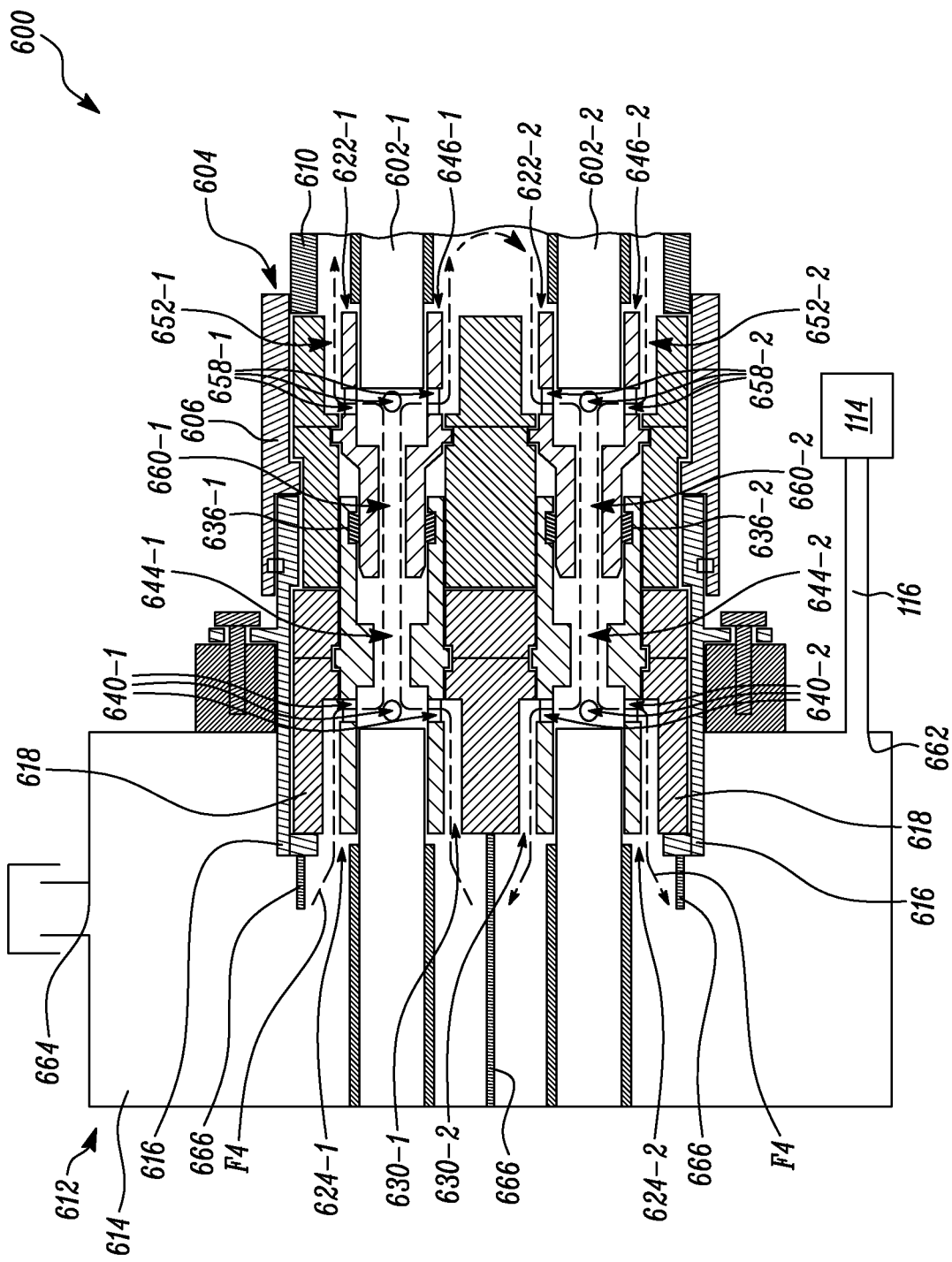
FIG. 6 is a schematic view of another connector assembly including a first connector arrangement and a second connector arrangement, wherein a fluid enters the first connector arrangement via a first socket thereof, according to examples of the present disclosure.

FIG. 6 illustrates an exemplary connector assembly 600 that is different from the connector assembly 200, according to another example of the present disclosure. Further, the connector assembly 600 may include a conduit 610 that may be similar to the conduit 210 explained in relation to FIG. 2. Additionally, a first charging cable 602-1 and a second charging cable 602-2 may be receivable within the conduit 610. The first and second charging cables 602-1, 602-2 may be similar to the charging cable 202 explained in relation to FIG. 2. Moreover, the connector assembly 600 includes a receptacle 612 similar to the receptacle 212 explained in relation to FIG. 2. The receptacle 612 includes a receptacle box 614, a receptacle outer shell 616, and a receptacle insulator sleeve 618.

In the illustrated example of FIG. 6, the receptacle 612 also includes a number of guiding devices 666. Specifically, in the illustrated example of FIG. 6, the receptacle 612 includes three guiding devices 666, without any limitations. The guiding devices 666 may guide the fluid into and out of a first connector arrangement 622-1 and a second connector arrangement 622-2 of the connector assembly 600. The guiding devices 666 may include baffled, louvers, or any other device that may guide the fluid into and out of the connector arrangements 622-1, 622-2. Further, the connector assembly 600 may include a plug 604 similar to the plug 204 explained in relation to FIG. 2. The plug 604 may include a plug outer shell 606 and a plug insulator sleeve 608.

In the illustrated example of FIG. 6, the connector assembly 600 may include two connector arrangements 622-1, 622-2. For example, the connector assembly 600 may include one or more first connector arrangements 622-1 including a first socket 624-1 and a first charging pin 646-1, and one or more second connector arrangements 622-2 including a second socket 624-2 and a second charging pin 646-2. Functionalities of the first and second connector arrangements 622-1, 622-2 may be similar to the connector arrangement 222 explained in relation to FIGS. 2 to 5. It should be noted that the first socket 624-1 and the second socket 624-2 may be similar in design and functionalities to the socket 224 explained in relation FIGS. 2 and 3. It should be further noted that the first charging pin 646-1 and the second charging pin 646-2 may be similar in design and functionalities to the charging pin 246 explained in relation FIGS. 2 and 3.

Further, the first socket 624-1 may include a number of first through-apertures 640-1 and a first passage 644-1 similar to the first through-apertures 240 and the first passage 644 defined in the socket 224. The first socket 624-1 may also include one or more socket contacts 636-1 similar to the socket contact 236 (see FIG. 2). Additionally, a first fluid channel 630-1 may be defined between the receptacle insulator sleeve 618 and the first socket 624-1.

Moreover, the second socket 624-2 may include a number of first through-apertures 640-2 and a first passage 644-2 similar to the first through-apertures 240 and the first passage 244 defined in the socket 224. The second socket 624-2 may also include one or more socket contacts 636-1 similar to the socket contact 236. Additionally, a first fluid channel 630-2 may be defined between the receptacle insulator sleeve 618 and the second socket 624-2.

Further, the first charging pin 646-1 may include a number of second through-apertures 658-1 and a second passage 660-1 similar to the second through-apertures 258 and the second passage 260 defined in the charging pin 246. Additionally, a second fluid channel 652-1 may be defined between the plug insulator sleeve 608 and the first charging pin 646-1. Moreover, the first charging cable 602-1 may be connected to the first charging pin 646-1.

Further, the second charging pin 646-2 may include a number of second through-apertures 658-2 and a second passage 660-2 similar to the second through-apertures 258 and the second passage 260 defined in the charging pin 246. Additionally, a second fluid channel 652-2 may be defined between the plug insulator sleeve 608 and the second charging pin 646-2. Moreover, the second charging cable 602-2 may be connected to the second charging pin 646-2.

In an example, the fluid may enter the first connector arrangement 622-1 through the first socket 624-1 and exit the second connector arrangement 622-2 through the second socket 624-2. The guiding devices 666 may ensure that the fluid enters the first connector arrangement 622-1 through the first socket 624-1 and exits the second connector arrangement 622-2 through the second socket 624-2. In such an example, the receptacle 612 may receive the fluid from the external air source 114. Specifically, the hose 116 may connect to an inlet port 662 defined in the receptacle box 614. An exemplary flow path "F4" of the fluid through the first and second connector arrangements 622-1, 622-2 is illustrated in FIG. 6.

In the illustrated example of FIG. 6, when the first socket 624-1 is connected with the first charging pin 646-1 and the second socket 624-2 is connected with the second charging pin 646-2, the fluid enters the one or more first connector arrangements 622-1 through the first socket 624-1 of the one or more first connector arrangements 622-1. Specifically, the fluid received within the receptacle box 614 may flow through the first fluid channel 630-1 of the first socket 624-1 and may subsequently flow through the first through-apertures 640-1. Further, the fluid may flow through each of the first and second passages 644-1, 660-1. Moreover, the fluid may exit the one or more first connector arrangements 622-1 through the first charging pin 646-1 of the one or more first connector arrangements 622-1. Specifically, the fluid may flow through the second passage 660-1 and the second through-apertures 658-1, and may be subsequently introduced in the second fluid channel 652-1. From the second fluid channel 652-1, the fluid may be introduced within the conduit 610.

Further, the fluid exiting the first charging pin 646-1 may enter the one or more second connector arrangements 622-2 through the second charging pin 646-2 of the one or more second connector arrangements 622-2. The fluid may enter the second charging pin 646-2 via the second fluid channel 652-2 and the second through-apertures 658-2. Further, the fluid may flow through the second passage 660-2 and may be subsequently introduced in the first passage 644-2 of the second socket 624-2. Furthermore, the fluid may exit the one or more second connector arrangements 622-2 through the second socket 624-2 of the one or more second connector arrangements 622-2. Specifically, the fluid may flow through the first passage 644-2 and the first through-apertures 640-2, and may be subsequently introduced in the first fluid channel 630-2. From the first fluid channel 630-2, the fluid may be introduced within the receptacle box 614 before being let out to the surrounding via an outlet port 664 defined in the receptacle box 614.

Figure 7:
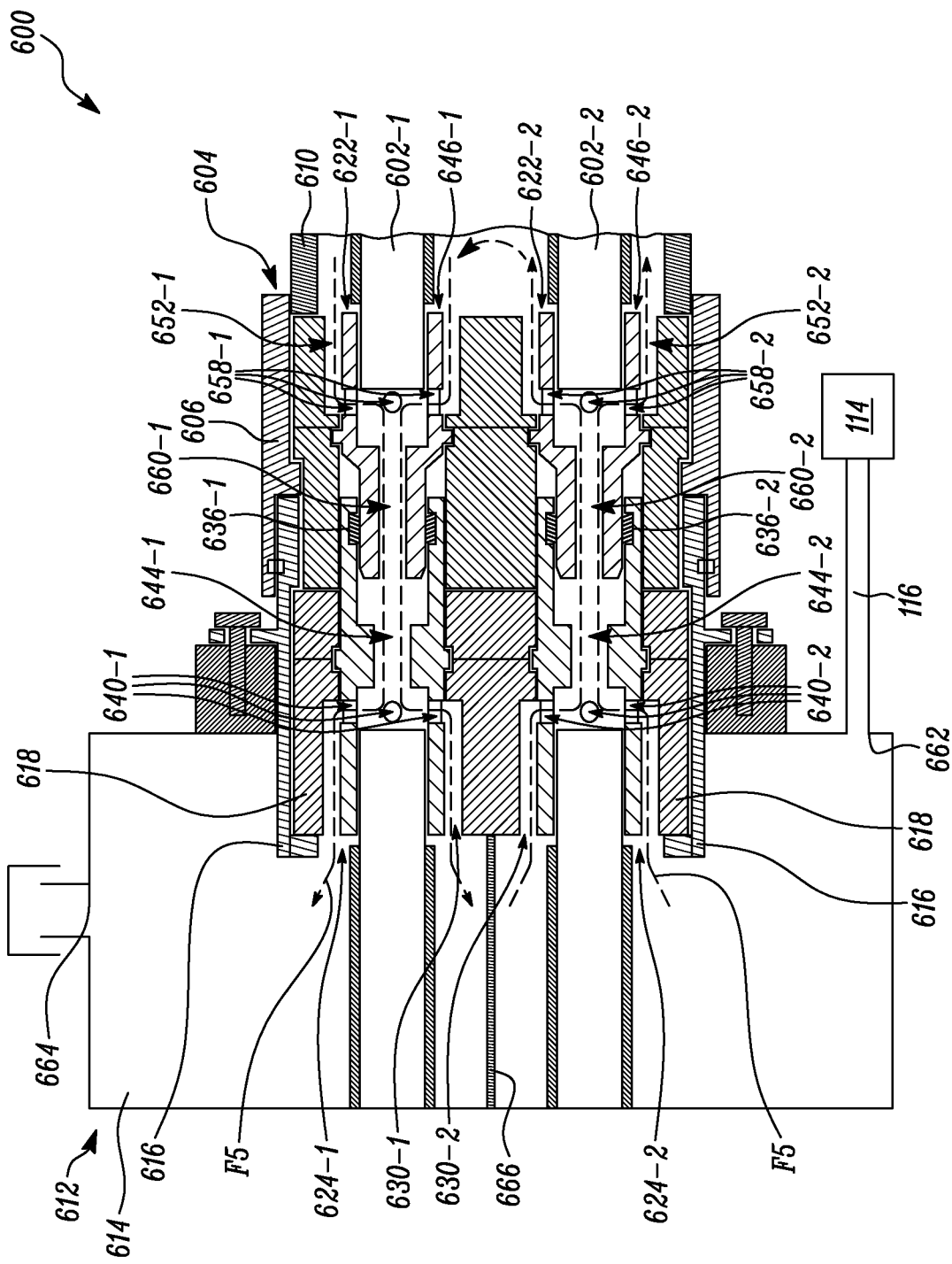
FIG. 7 is a schematic view of the connector assembly of FIG. 6, wherein the fluid enters the second connector arrangement via a second socket thereof, according to examples of the present disclosure.

In an example, as illustrated in FIG. 7, the fluid may enter the second connector arrangement 622-2 through the second socket 624-2 and may exit the first connector arrangement 622-1 through the first socket 624-1. In the illustrated example of FIG. 7, the connector assembly 600 may include the single guiding device 666 to ensure the fluid enters the second connector arrangement 622-2 through the second socket 624-2 and exits the first connector arrangement 622-1 through the first socket 624-1. In such an example, the receptacle 612 receives the fluid from the external air source 114. Specifically, the hose 116 may connect to the inlet port 662 (see FIG. 6) defined in the receptacle box 614. An exemplary flow path "F5" of the fluid through the first and second connector arrangements 622-1, 622-2 is illustrated in FIG. 7.

In the illustrated example of FIG. 7, when the first socket 624-1 is connected with the first charging pin 646-1 and the second socket 624-2 is connected with the second charging pin 646-2, the fluid enters the one or more second connector arrangements 622-2 through the second socket 624-2 of the one or more second connector arrangements 622-2. Specifically, the fluid received within the receptacle box 614 may flow through the first fluid channel 630-2 of the second socket 624-2 and may be subsequently introduced in the first through-apertures 640-2. Further, the fluid may flow through each of the first and second passages 644-2, 660-2. Moreover, the fluid may exit the one or more second connector arrangements 622-2 through the second charging pin 646-2 of the one or more second connector arrangements 622-2. Specifically, the fluid may flow through the second passage 660-2 and the second through-apertures 658-2, and may be subsequently introduced in the second fluid channel 652-2.

From the second fluid channel 652-2, the fluid may be introduced within the conduit 610.

Further, the fluid exiting the second charging pin 646-2 may enter the one or more first connector arrangements 622-1 through the first charging pin 646-1 of the one or more first connector arrangements 622-1. The fluid may enter the first charging pin 646-1 via the second fluid channel 652-1 and the second through-apertures 658-1. Further, the fluid may flow through the second passage 660-1 and may be subsequently introduced in the first passage 644-1 of the first socket 624-1. Furthermore, the fluid may exit the one or more first connector arrangements 622-1 through the first socket 624-1 of the one or more first connector arrangements 622-1. Specifically, the fluid may flow through the first passage 644-1 and the first through-apertures 640-1, and may be subsequently introduced in the first fluid channel 630-1. From the first fluid channel 630-1, the fluid may be introduced within the receptacle box 614 before being let out to the surrounding via the outlet port 664 (see FIG. 6) defined in the receptacle box 614.

Figure 8:
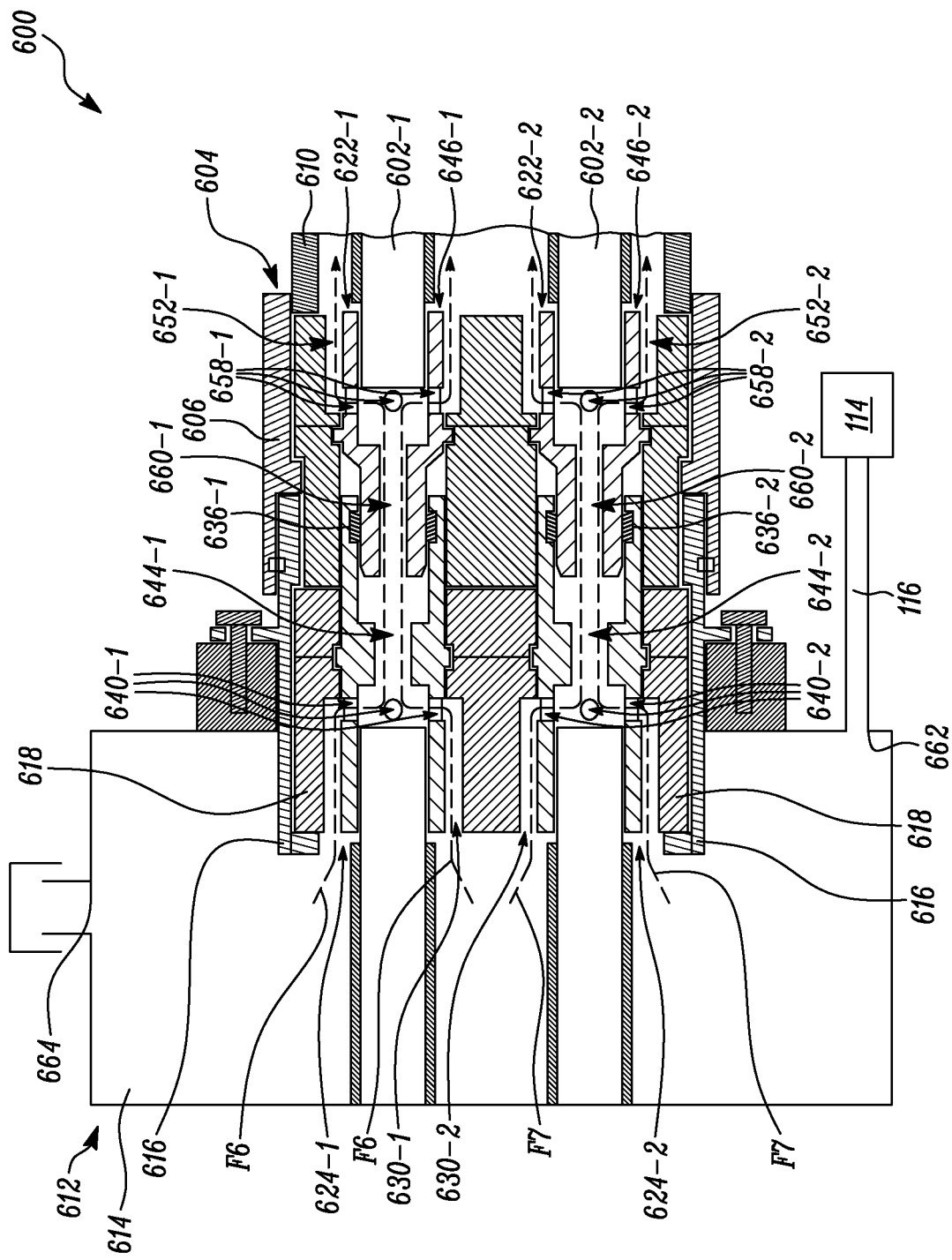
FIG. 8 is a schematic view of the connector assembly of FIG. 6, wherein the fluid enters each of the first and second connector arrangements via corresponding first and second sockets, according to examples of the present disclosure.

In yet another example, as illustrated in FIG. 8, the fluid may enter the first connector arrangement 622-1 through the first socket 624-1 as well as the second connector arrangement 622-2 through the second socket 624-2. In such an example, the receptacle 612 may receive the fluid from the external air source 114. Specifically, the hose 116 may connect to the inlet port 662 (see FIG. 6) defined in the receptacle box 614.

In the illustrated example of FIG. 8, when the first socket 624-1 is connected with the first charging pin 646-1 and the second socket 624-2 is connected with the second charging pin 646-2, a first fluid flow "F6" may enter the one or more first connector arrangements 622-1 through the first socket 624-1 of the one or more first connector arrangements 622-1. Specifically, the fluid received within the receptacle box 614 may flow through the first fluid channel 630-1 of the first socket 624-1 and may be subsequently introduced in the first through-apertures 640-1. Further, the fluid may flow through each of the first and second passages 644-1, 660-1. Moreover, the fluid may exit the one or more first connector arrangements 622-1 through the first charging pin 646-1 of the one or more first connector arrangements 622-1. Specifically, the fluid may flow through the second passage 660-1 and the second through-apertures 658-1, and may be subsequently introduced in the second fluid channel 652-1. From the second fluid channel 652-1, the fluid may be introduced within the conduit 610. The fluid may flow through the conduit 610, thereby cooling the charging cable 602 before being discharged to the surrounding.

Further, when the first socket 624-1 is connected with the first charging pin 646-1 and the second socket 624-2 is connected with the second charging pin 646-2, a second fluid flow "F7" may enter the one or more second connector arrangements 622-2 through the second socket 624-2 of the one or more second connector arrangements 622-2. Specifically, the fluid received within the receptacle box 614 may flow through the first fluid channel 630-2 of the second socket 624-2 and may be subsequently introduced in the first through-apertures 640-2. Further, the fluid may flow through each of the first and second passages 644-2, 660-2. Moreover, the fluid may exit the one or more second connector arrangements 622-2 through the second charging pin 646-2 of the one or more second connector arrangements 622-2. Specifically, the fluid may flow through the second passage 660-2 and the second through-apertures 658-2, and may be subsequently introduced in the second fluid channel 652-2. From the second fluid channel 652-2, the fluid may be introduced within the conduit 610. The fluid may flow through the conduit 610, thereby cooling the charging cable 602 before being discharged to the surrounding.

Figure 9:
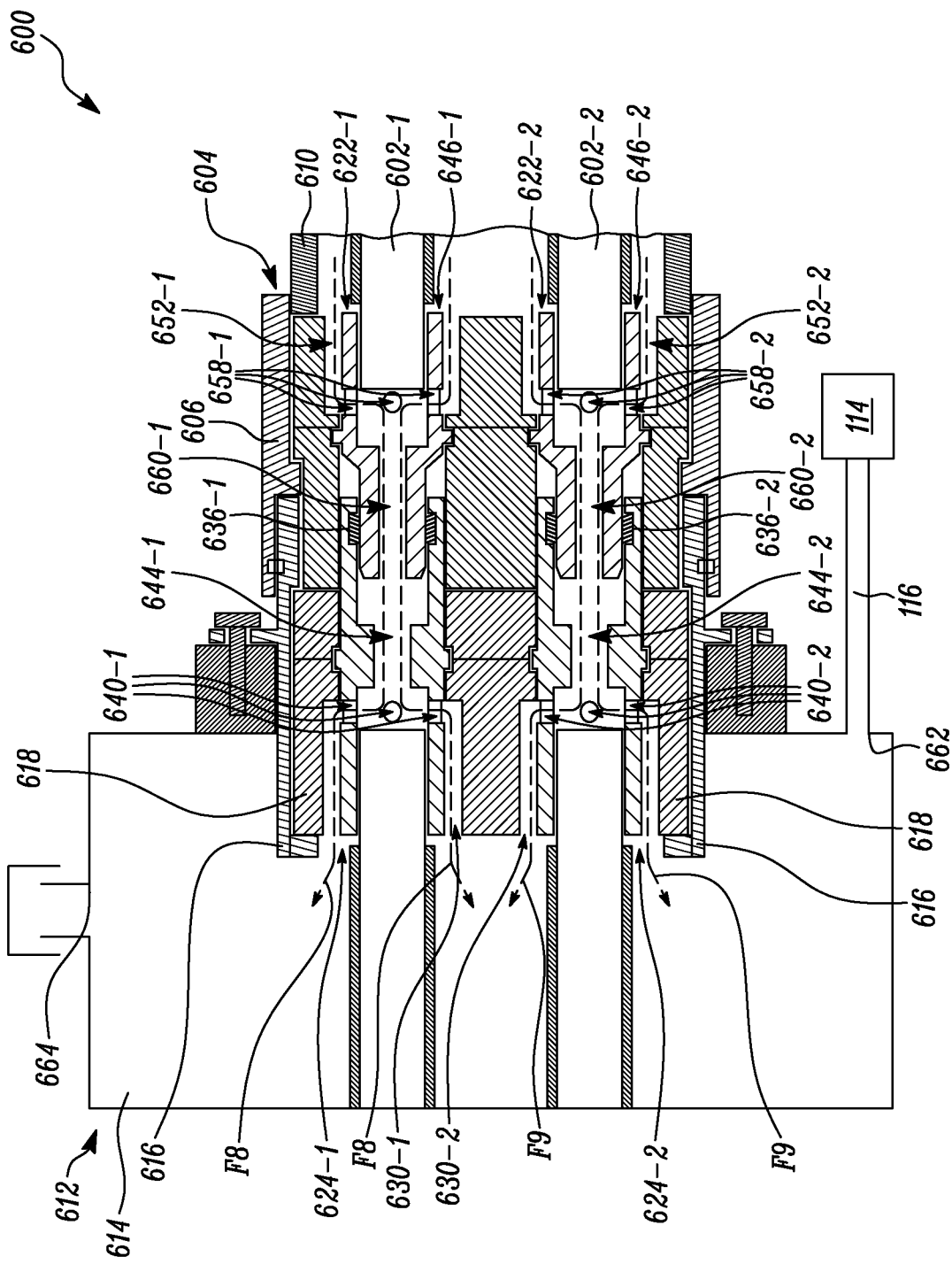
FIG. 9 is a schematic view of the connector assembly of FIG. 6, wherein the fluid enters each of the first and second connector arrangements via corresponding first and second charging pins, according to examples of the present disclosure.

Referring now to FIG. 9, the fluid may enter the first connector arrangement 622-1 through the first charging pin 646-1 as well as the second connector arrangement 622-2 through the second charging pin 646-2. In such an example, the conduit 610 may receive the fluid from the external air source 114. In the illustrated example of FIG. 9, when the first socket 624-1 is connected with the first charging pin 646-1 and the second socket 624-2 is connected with the second charging pin 646-2, a third fluid flow "F8" may enter the one or more first connector arrangements 622-1 through the first charging pin 646-1 of the one or more first connector arrangements 622-1. Further, the fluid may flow through the second passage 660-1 and may be subsequently introduced in the first passage 644-1 of the first socket 624-1. Furthermore, the third fluid flow "F8" may exit the one or more first connector arrangements 622-1 through the first socket 624-1 of the one or more first connector arrangements 622-1. Specifically, the fluid received from the first charging pin 646-1 may flow through the first passage 644-1 and the first through-apertures 640-1, and may be subsequently introduced in the first fluid channel 630-1. From the first fluid channel 630-1, the fluid may be introduced within the receptacle box 614 before being let out to the surrounding via the outlet port 664 (see FIG. 6) defined in the receptacle box 614.

Further, when the first socket 624-1 is connected with the first charging pin 646-1 and the second socket 624-2 is connected with the second charging pin 646-2, a fourth fluid flow "F9" may enter the one or more second connector arrangements 622-2 through the second charging pin 646-2 of the one or more second connector arrangements 622-2. Further, the fluid may flow through the second passage 660-2 and may be subsequently introduced in the first passage 644-2 of the second socket 624-2. Furthermore, the fourth fluid flow "F9" may exit the one or more second connector arrangements 622-2 through the second socket 624-2 of the one or more second connector arrangements 622-2. Specifically, the fluid received from the second charging pin 646-2 may flow through the first passage 644-2 and the first through-apertures 640-2, and may be subsequently introduced in the first fluid channel 630-2. From the first fluid channel 630-2, the fluid may be introduced within the receptacle box 614 before being let out to the surrounding via the outlet port 664 defined in the receptacle box 614.

INDUSTRIAL APPLICABILITY

The present disclosure relates to the connector assembly 200, 600 that may allow charging of the battery system 108 of the work machine 100. This section will now be explained in relation to the connector assembly 200 described in relation to FIGS. 2 to 5. However, it should be noted that the details provided in this section are equally applicable to the connector assembly 600 described in relation to FIGS. 6 to 9.

The connector assembly 200 describes an improved technique that may allow efficient cooling as well as cleaning of various components the connector assembly 200. For example, when the socket 224 may be connected to the charging pin 246, the fluid flowing through the connector arrangement 222 may cool the various components of the connector assembly 200. A technique of cooling as described herein may allow fast charging of the battery system 108, which may in turn eliminate a requirement of multiple battery systems to operate the work machine 100. Moreover, the cooling technique may also eliminate safety and infrastructure challenges presented due to removal and installation of large-sized battery systems for off-board charging.

Further, when the socket 224 may be disconnected from the charging pin 246, the fluid flowing through the socket 224 may allow cleaning of the socket 224. Furthermore, a cleansing effect provided by the fluid that may reduce wear and tear at various contact points between the charging pin 246 and the socket 224.

Further, the fluid may include compressed air which may be easily available at mining and construction sites to clean and/or cool the connector assembly 200. Furthermore, various fittings that may be used to establish fluid flow through the connector assembly 200 may be robust, may be easily available, and may be cost-effective. Moreover, the usage of compressed air as the fluid may not affect high voltage conductors of the connector assembly 200. Additionally, as the first through-apertures 240 are defined proximate to the first end 226 of the socket 224 and the socket contact 236 is provided at the second end 228 of the socket 224, it may be possible to dispose two or more socket contacts instead of the single socket contact 236 for increasing a charging capability provided by the connector assembly 200. It should be further noted that the cooling and cleaning technique described herein may be applied to different charging pin and socket arrangements, without any limitations.

Figure 10:
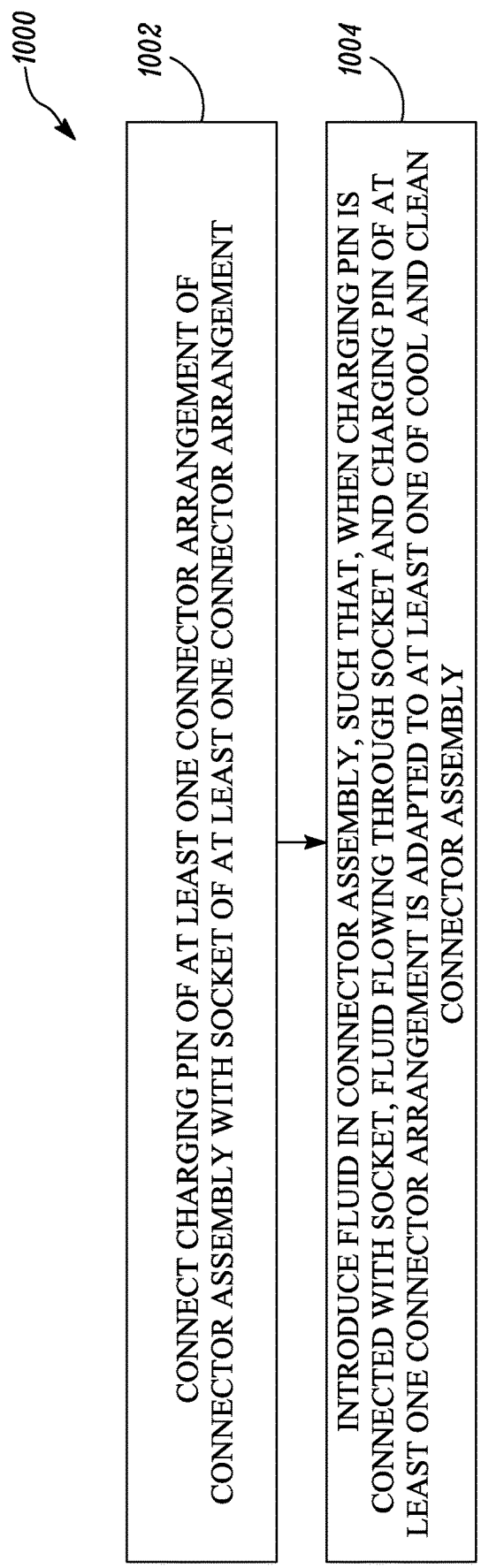
FIG. 10 is a flowchart depicting a method for at least one of cooling and cleaning the connector assembly, according to examples of the present disclosure.

FIG. 10 is a flowchart depicting a method 1000 for cooling and/or cleaning the connector assembly 200. The connector assembly 200 allows charging of the work machine 100. The connector assembly 200 includes the one or more charging cables 202. At step 1002, the charging pin 246 of the one or more connector arrangements 222 of the connector assembly 200 is connected with the socket 224 of the one or more connector arrangements 222. The socket 224 is disposed on the work machine 100 and extends along the first longitudinal axis "A1". The socket 224 defines the number of first through-apertures 240 extending radially relative to the first longitudinal axis "A1", and the first passage 244 extending along the first longitudinal axis "A1" and in fluid communication with each of the number of first through-apertures 240. Further, the charging pin 246 is electrically connected to the one or more charging cables 202 and extends along the second longitudinal axis "A2". The charging pin 246 defines the number of second through-apertures 258 extending radially relative to the second longitudinal axis "A2", and the second passage 260 extending along the second longitudinal axis "A2" and in fluid communication with each of the number of second through-apertures 258. Further, when the socket 224 is connected with the charging pin 246, the second passage 260 aligns with the first passage 244 and the second passage 260 is in fluid communication with the first passage 244.

At step 1004, the fluid is introduced in the connector assembly 200, such that, when the charging pin 246 is connected with the socket 224, the fluid flowing through the socket 224 and the charging pin 246 of the one or more connector arrangements 222 is adapted to cool and/or clean the connector assembly 200.

In an example, the fluid is introduced in the connector assembly 200 through one or more of the number of first through-apertures 240 in the socket 224. Further, the fluid is passed through each of the first and second passages 244, 260. Moreover, the fluid is discharged from the connector assembly 200 through one or more of the number of second through-apertures 258 in the charging pin 246.

In another example, the fluid is introduced in the connector assembly 200 through one or more of the number of second through-apertures 258 in the charging pin 246. Further, the fluid is passed through each of the first and second passages 244, 260. Moreover, the fluid is discharged from the connector assembly 200 through one or more of the number of first through-apertures 240 in the socket 224.

In some examples, the charging pin 246 may be disconnected from the socket 224. Furthermore, the fluid may be introduced in the socket 224 through one or more of the number of first through-apertures 240 in the socket 224, such that the fluid flowing through the socket 224 may clean the socket 224. Moreover, the fluid may be discharged from the connector assembly 200 through the first passage 244 in the socket 224.

In some examples, the first charging pin 646-1 of the one or more first connector arrangements 622-1 may be connected with the first socket 624-1 of the one or more first connector arrangements 622-1, and the second charging pin 646-2 of the one or more second connector arrangements 622-2 may be connected with the second socket 624-2 of the one or more second connector arrangements 622-2.

In an example, the fluid may be introduced within the one or more first connector arrangements 622-1 through the first socket 624-1 of the one or more first connector arrangements 622-1. Further, the fluid may be discharged from the one or more first connector arrangements 622-1 through the first charging pin 646-1 of the one or more first connector arrangements 622-1. Furthermore, the fluid exiting the first charging pin 646-1 may be introduced within the one or more second connector arrangements 622-2 through the second charging pin 646-2 of the one or more second connector arrangements 622-2. Moreover, the fluid may be discharged from the one or more second connector arrangements 622-2 through the second socket 624-2 of the one or more second connector arrangements 622-2.

In another example, the fluid may be introduced within the one or more second connector arrangements 622-2 through the second socket 624-2 of the one or more second connector arrangements 622-2. Further, the fluid may be discharged from the one or more second connector arrangements 622-2 through the second charging pin 646-2 of the one or more second connector arrangements 622-2. Furthermore, the fluid exiting the second charging pin 646-2 may be introduced within the one or more first connector arrangements 622-1 through the first charging pin 646-1 of the one or more first connector arrangements 622-1. Moreover, the fluid may be discharged from the one or more first connector arrangements 622-1 through the first socket 624-1 of the one or more first connector arrangements 622-1.

In yet another example, the first fluid flow "F6" may be introduced within the one or more first connector arrangements 622-1 through the first socket 624-1 of the one or more first connector arrangements 622-1. Further, the first fluid flow "F6" may be discharged from the one or more first connector arrangements 622-1 through the first charging pin 646-1 of the one or more first connector arrangements 622-1. Furthermore, the second fluid flow "F7" may be introduced within the one or more second connector arrangements 622-2 through the second socket 624-2 of the one or more second connector arrangements 622-2. Moreover, the second fluid flow "F7" may be discharged from the one or more second connector arrangements 622-2 through the second charging pin 646-2 of the one or more second connector arrangements 622-2.

In an example, the third fluid flow "F8" may be introduced within the one or more first connector arrangements 622-1 through the first charging pin 646-1 of the one or more first connector arrangements 622-1. Further, the third fluid flow "F8" may be discharged from the one or more first connector arrangements 622-1 through the first socket 624-1 of the one or more first connector arrangements 622-1. Furthermore, the fourth fluid flow "F9" may be introduced within the one or more second connector arrangements 622-2 through the second charging pin 646-2 of the one or more second connector arrangements 622-2. Moreover, the fourth fluid flow "F9" may be discharged from the one or more second connector arrangements 622-2 through the second socket 624-2 of the one or more second connector arrangements 622-2.

It may be desirable to perform one or more of the steps associated with the method 1000 in an order different from that depicted. Furthermore, various steps could be performed together.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A connector assembly for charging a work machine, the connector assembly comprising:
   a receptacle configured to receive compressed air from an external air source,
   at least one charging cable;
   a first connector arrangement; and
   a second connector arrangement,
      the first connector arrangement including:
         a first socket extending along a first longitudinal axis, the first socket defining:
            a plurality of first through-apertures extending radially relative to the first longitudinal axis, and
            a first passage extending along the first longitudinal axis and in fluid communication with each of the plurality of first through-apertures,
            the plurality of first through-apertures being configured to introduce the compressed air from the receptacle and into the first connector arrangement; and
         a charging pin electrically connected to the at least one charging cable,
            the charging pin being configured to couple with the first socket,
            the charging pin extending along a second longitudinal axis,
            the charging pin defining:
               a plurality of second through-apertures extending radially relative to the second longitudinal axis; and
               a second passage extending along the second longitudinal axis and in fluid communication with each of the plurality of second through-apertures,
               wherein, when the first socket is connected with the charging pin:
                  the second passage aligns with the first passage and the second passage is in fluid communication with the first passage; and
                  a fluid flowing through the first socket and the charging pin is configured to at least one of cool or clean the connector assembly,
      the fluid including the compressed air,
      the second connector arrangement including a second socket, and
      the receptacle including:
         a first guiding device configured to guide the fluid into the first connector arrangement through the first socket, and
         a second guiding device configured to guide the fluid out of the second connector arrangement through the second socket.

2. The connector assembly of claim 1, wherein, when the first socket is connected with the charging pin:
   the fluid flows through each of the first and second passages; and
   the fluid exits the first connector arrangement through one or more of the plurality of second through-apertures.

3. The connector assembly of claim 1,
   wherein, when the first socket is disconnected from the charging pin, the fluid flowing through the first socket is configured to clean the first socket, and
   wherein, when the first socket is connected with the charging pin:
      the fluid enters the first socket through one or more of the plurality of first through-apertures; and
      the fluid exits the first socket through the first passage.

4. The connector assembly of claim 1,
   wherein the charging pin is a first charging pin,
   wherein the second connector arrangement further includes a second charging pin, and
   wherein, when the first socket is connected with the first charging pin and the second socket is connected with the second charging pin:
      the fluid enters the first connector arrangement through the first socket;
      the fluid exits the first connector arrangement through the first charging pin;
      the fluid exiting the first charging pin enters the second connector arrangement through the second charging pin; and
      the fluid exits the second connector arrangement through the second socket.

5. The connector assembly of claim 1,
   wherein the plurality of first through-apertures are defined proximate to a first end of the first socket, and
   wherein the first socket includes one or more socket contacts disposed proximate to a second end of the first socket,
   the second end being defined opposite to the first end.

6. The connector assembly of claim 1, further comprising:
   a plug,
   wherein the charging pin is mounted within the plug.

7. The connector assembly of claim 1, wherein the receptacle further includes:
   a third guiding device configured to guide the fluid into the first connector arrangement through the first socket and guide the fluid out of the second connector arrangement through the second socket.

8. The connector assembly of claim 1, wherein the first guiding device and the second guiding device include a baffle and a louver.

9. The connector assembly of claim 1,
   wherein the receptacle includes a receptacle box, and wherein the second connector arrangement is disposed between the first connector arrangement and an inlet port of the receptacle box.

10. The connector assembly of claim 1, further comprising:
a plug disposed at an end of a charging cable of the at least one charging cable.

11. The connector assembly of claim 1,
wherein the receptacle includes:
a receptacle box configured to receive the compressed air from the external air source,
a receptacle outer shell connected to the receptacle box with one or more mechanical fasteners, and
a receptacle insulator sleeve, and
wherein the connector assembly further includes:
a plug outer shell that is configured to be adjacent to the receptacle outer shell, and
a plug insulator sleeve that is configured to be adjacent to the plug outer shell and the receptacle insulator sleeve.

12. The connector assembly of claim 1, further comprising:
a flexible pipe configured to receive a charging cable of the at least one charging cable.

13. The connector assembly of claim 1,
wherein the receptacle further includes:
an inlet port configured to be connected to the external air source, and
an outlet port configured to let the fluid out of the receptacle, and
wherein the first guiding device and the second guiding device are between the inlet port and the outlet port.

14. The connector assembly of claim 1,
wherein the receptacle includes a receptacle box, a receptacle outer shell, and a receptacle insulator sleeve,
wherein the first socket is mounted in the receptacle,
wherein a first fluid channel is defined between the receptacle insulator sleeve and the first socket,
wherein the receptacle box is configured to receive the compressed air, and
wherein the first fluid channel is configured to provide the compressed air from the receptacle box and to the plurality of first through-apertures.

15. The connector assembly of claim 14,
wherein the receptacle outer shell is connected to the receptacle box with one or more mechanical fasteners,
wherein a second fluid channel is defined between a plug insulator sleeve and a portion of the charging pin, and
wherein the plurality of second through-apertures are configured to provide an exit for the compressed air from the first connector arrangement and into the second fluid channel.

16. A method for at least one of cooling or cleaning a connector assembly for charging a work machine, the method comprising:
connecting a charging pin of a first connector arrangement of the connector assembly with a first socket of the first connector arrangement,
the first socket extending along a first longitudinal axis,
the first socket defining a plurality of first through-apertures extending radially relative to the first longitudinal axis, and
a first passage extending along the first longitudinal axis and in fluid communication with each of the plurality of first through-apertures,
the charging pin being electrically connected to at least one charging cable and extending along a second longitudinal axis,
the charging pin defining:
a plurality of second through-apertures extending radially relative to the second longitudinal axis, and
a second passage extending along the second longitudinal axis and in fluid communication with each of the plurality of second through-apertures, and
wherein, when the first socket is connected with the charging pin;
introducing compressed air from an external air source and into a receptacle of the connector assembly; and
introducing a fluid from the receptacle and into the first connector arrangement via the plurality of first through-apertures, such that the fluid flowing through the first socket and the charging pin of the first connector arrangement is configured to at least one of cool or clean the connector assembly,
the fluid including the compressed air,
the connector assembly further including a second connector arrangement,
the second connector arrangement including a second socket, and
the receptacle including:
a first guiding device configured to guide the fluid into the first connector arrangement through the first socket, and
a second guiding device configured to guide the fluid out of the second connector arrangement through the second socket.

17. The method of claim 16, further comprising:
passing the fluid through each of the first and second passages; and
discharging the fluid through one or more of the plurality of second through-apertures.

18. The method of claim 16, further comprising:
disconnecting the charging pin from the first socket; and
discharging the fluid from the connector assembly through the first passage.

19. The method of claim 16,
wherein the charging pin is a first charging pin, and
wherein the method further comprises:
connecting a second charging pin of the second connector arrangement with the second socket.

20. The method of claim 19, further comprising:
discharging the fluid from the first connector arrangement through the first charging pin;
introducing the fluid exiting the first charging pin through the second charging pin; and
discharging the fluid from the second connector arrangement through the second socket.

* * * * *